Figure 1:
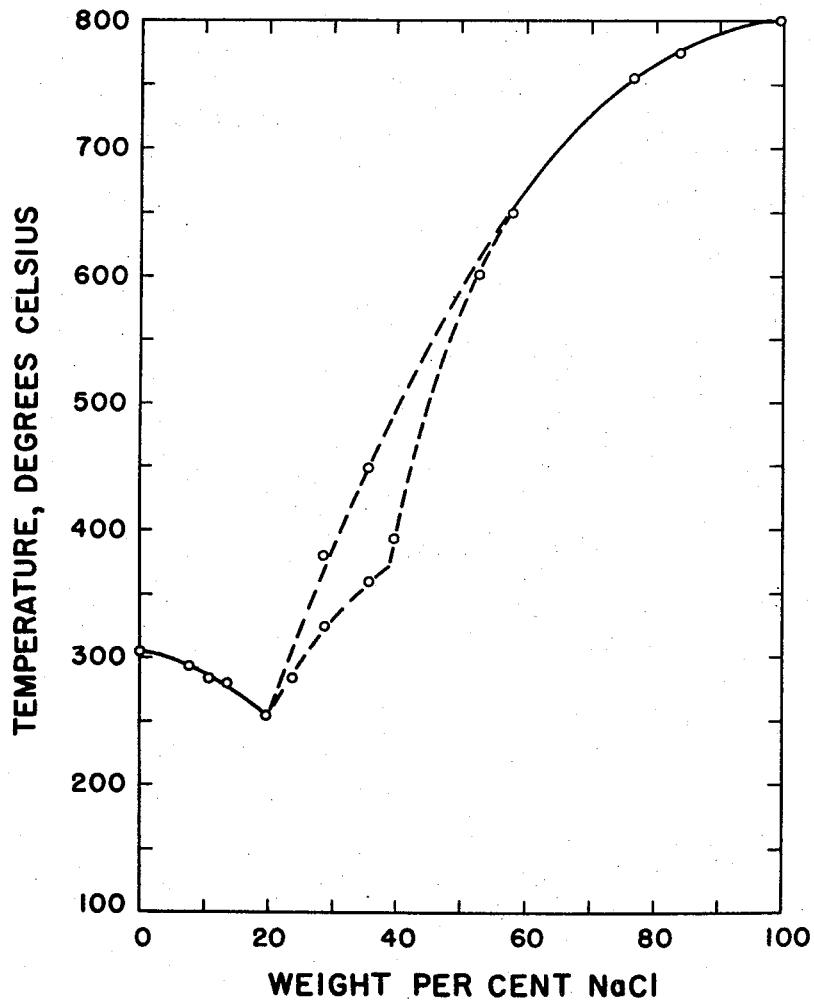

ZnCl$_2$-NaCl SYSTEM

PuCl$_3$-NaCl SYSTEM

United States Patent Office 2,886,410
Patented May 12, 1959

2,886,410

NON-AQUEOUS DISSOLUTION OF MASSIVE PLUTONIUM

James G. Reavis and Joseph A. Leary, Los Alamos, N. Mex., and Kenneth A. Walsh, Lakeland, Fla., assignors to the United States of America as represented by the United States Atomic Energy Commission Application April 4, 1958, Serial No. 726,593

6 Claims. (Cl. 23—14.5)

The present invention relates to plutonium chemistry, and more particularly to methods for obtaining non-aqueous solutions of plutonium from massive forms of the metal.

The process of the instant invention was developed primarily as a preliminary step in an over-all scheme for the purification of spent fuel rods of plutonium or plutonium alloys, i.e., fuel rods in which the fissionable nuclides have been partially depleted and fission product nuclides have been accumulated to the extent that a separation of the plutonium from such fission products is called for. A number of methods have been developed for such separations, including the fluoride and oxalate precipitation processes disclosed in the patent to Wahl, U.S. Patent 2,813,004. This process commences with the dissolution of the metal in an aqueous solution and the remaining steps of the process also take place in such aqueous solutions, a condition avoided in the present invention.

Accordingly, it is an object of the present invention to provide a method for dissolving massive plutonium in a non-aqueous solution.

Another object is to provide a method for dissolving massive plutonium in a non-aqueous medium at low temperatures and pressures.

It is a further object to provide a method for dissolving spent fuel rods consisting of partially depleted plutonium and fission products of plutonium in a non-aqueous medium wherein substantially all of said plutonium will go into solution in said medium and a portion of said fission products will not go into solution in said medium.

The foregoing objects are achieved in the present invention by adding the massive plutonium to be fused salt bath consisting of two or more metal halides, in one of which the cation is replaced by the plutonium and precipitated in metallic form. The fused salt bath will then consist of a plutonium halide and one or more other metal halides and can be further processed to obtain pure plutonium metal.

In the preferred embodiment, the salt solution consists of zinc chloride and sodium chloride. The plutonium pieces may be added to the solid salts at room temperature or to the melt. The plutonium displaces the zinc in accordance with the reaction $$2Pu + 3ZnCl_2 \rightarrow 3Zn + 2PuCl_3$$

When the zinc and plutonium thus mixed are the stoichiometric amounts required for the reaction, the reaction is more than 97% complete, i.e., less than 3% of the plutonium remains as metal. By using an excess of zinc chloride, the yield can be increased to an amount approaching 100%, such as the 99.86% yield in Example 4 below.

Figure 2:
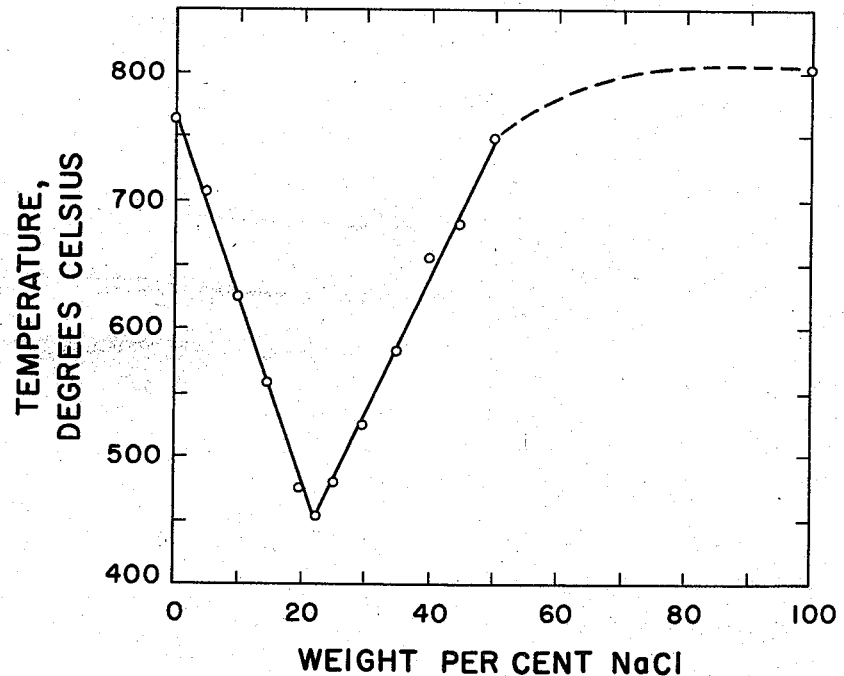

As indicated in the phase diagram shown in Fig. 1 of the drawings attached hereto, $ZnCl_2$ and NaCl are soluble in all proportions, forming a eutectic of 80 w/o $ZnCl_2$ and 20 w/o NaCl at 255° C. (The symbol "w/o" is used herein to designate a percentage by weight.) The phase diagram for $PuCl_3$ and NaCl in Fig. 2 also indicates complete mutual solubility with a eutectic of about 77.7 w/o $PuCl_3$ and 22.3 w/o NaCl at 455° C. The dashed portions of these phase diagrams indicate areas of uncertainty. In the NaCl—$ZnCl_2$ system, melts of the same composition passed from the liquid to the solid phase at different temperatures during different cooling runs, for compositions in the range above 20 w/o NaCl to 58 w/o NaCl. The phase diagram for the $PuCl_3$—NaCl system for fractions of NaCl greater than 50 w/o and less than 100 w/o has not been investigated.

Since it is highly desirable for many reasons to keep the $PuCl_3$—NaCl melt temperature as low as possible, these facts make it advantageous to use a starting solution of 70 w/o $ZnCl_2$, 30 w/o NaCl, which has a low melting point of about 375° C., particularly when the zinc and plutonium are present in the stoichiometric amounts necessary for a complete displacement. When an excess of zinc chloride is used, the fact that the phase diagram for the $PuCl_3$—$ZnCl_2$—NaCl system has not been completely worked out injects some uncertainty as to the melting point of the ternary system after the displacement reaction. However, such uncertainty raises no overwhelmingly difficult problems, as the presence of such a third salt will lower the melting point of the solution below that for the binary system at the point of addition. If so desired, advantage may be taken of the high vapor pressure of $ZnCl_2$ relative to $PuCl_3$ and NaCl; the $ZnCl_2$ can be removed simply by evacuation of the reaction chamber, increasing the temperature, or a combination of both. However, the $ZnCl_2$ is relatively harmless, as any Zn metal so-deposited with Pu can easily be distilled out, Zn metal having a much higher vapor pressure than Pu metal and having a very limited solubility in Pu in any case.

It is necessary to conduct the process of the present invention with a protective blanket of an inert gas above the fused salts. In a vacuum at the temperatures involved, the aforementioned high vapor pressure of $ZnCl_2$ would cause it to evaporate so rapidly that it would leave the solution before the displacement reaction could take place. The inert blanket slows down this evaporation to a rate which will not interfere with the reaction. Any inert gas such as helium, neon, argon, etc., can be used, and any gas which will not react with the materials involved. The effective lower limit of the pressure of such gas is about ½ atmosphere. There is no upper limit on the pressure, but no advantage appears to be gained in exceeding atmospheric pressure.

To complete the purification process in which the process of the present invention is used, the chlorides product may be reduced with calcium in the bomb process disclosed by Baker in co-pending application Ser. No. 161,147, may be electrolyzed as fused salts, or may even be used in the various aqueous processes such as the aforementioned fluoride and oxalate precipitations disclosed by Wahl. While the first and last of these possibilities are demonstrably workable, the present invention will achieve maximum utility when it becomes possible to avoid all such methods and obtain a direct reduction by the mere addition of a reductant to the fused salt solution without the use of water. To this end a number of metals have been investigated. Magnesium metal has been added to a 650° C. melt of about 80 w/o $PuCl_3$ and 20 w/o NaCl in the stoichiometric amount calculated to displace the Pu. A well-formed metal button was formed in the solution, consisting of Pu and Mg. Although the Mg can easily be distilled out, the results do not make the process appear practicable, as the displacement reaction is only 25–30% complete.

As the over-all purification process has the single purpose of separating plutonium from its fission products, any such separation achieved by the present process is a distinct advantage. Here it can be pointed out that certain fission products such as ruthenium, palladium, and metals less reactive than zinc are automatically separated as the plutonium fuel rod is dissolved in the bath. These metals form no chlorides in such a bath and are collected with the displaced zinc. Other fission products in the fuel rod, e.g., zirconium, form soluble chlorides, such as $ZrCl_4$, which are distilled out at the bath temperature because of their high vapor pressures.

Included in the examples below is a summary of an experiment on a "fissium" alloy (Example 5). This example definitely shows that iron, zirconium, molybdenum and ruthenium are quantitatively removed by the process of the present invention. Thermodynamic considerations and general chemical similarity indicate that cobalt and nickel chlorides have the same stability as the chlorides of iron, i.e., either no stable chlorides of such metals are formed or they are easily distilled out at the bath temperatures involved. Similar considerations apply to the rhodium and palladium, which form a triad with ruthenium, and to niobium and technetium.

The remaining examples are included to illustrate the practice of the present invention. In these examples, the reactive materials were contained in a quartz crucible inside a quartz furnace tube. Any material volatilized from the melt either passed off through the gas supply port or condensed on the wall of the outer tube, and thus could not re-enter the reaction crucible. The Pyrex filter used for sampling the melt would pass the salt solution but not the liquid metals.

Examples (1) Five segments of 3 mm. diameter plutonium rod totalling 10.1 g. were added in a controlled manner to the stoichiometric amount of $ZnCl_2$ in a salt melt consisting of 70 w/o $ZnCl_2$—30 w/o NaCl. The melt was blanketed by about 0.5 atmosphere of argon in the quartz container. The first segment of plutonium was added when the melt temperature reached 415° C. and was completely hidden within two minutes by the deep blue color of the $PuCl_3$ produced. The additional metal segments were added as the temperature was raised to 600° C. The system was heated to about 800° C. and cooled at a rate of 1–2° per minute to give solidification beginning at about 475° C. The mixture was re-heated to about 500–550° and the products separated by forcing the salt melt through a Pyrex filter. Analysis of the metal button which was produced showed that 97% of the plutonium had been converted to $PuCl_3$. Plutonium remaining as metal was 0.27 g. by actual analysis.

(2) Excess plutonium in the form of a 0.3 inch diameter rod was suspended in 29.7 g. of melt containing 70 w/o $ZnCl_2$—30 w/o NaCl at 485–525° C. for 12 hours. A ½ atmosphere argon blanket was used, as before. Analysis of a sample of the product salt which was removed through a Pyrex filter at 525° C. showed that the salt phase consisted of 81.8 w/o $PuCl_3$, less than 0.7 w/o $ZnCl_2$ and (by difference) 18 w/o NaCl.

(3) Two segments of 0.25 inch diameter plutonium rod weighing a total of 21.8 g. were added to the stoichiometric quantity of $ZnCl_2$ in a 70 w/o $ZnCl_2$—30 w/o NaCl mixture in a quartz reaction tube at room temperature. The tube (which contained about 0.5 atmosphere argon) was heated to 800° C. in a period of about one hour and slowly cooled. The cooling curve indicated solidification beginning at about 455° C. The reaction products were separated by leaching with water at room temperature. The plutonium was quantitatively recovered and 98% was found to be $PuCl_3$. The concentration of $ZnCl_2$ in the salt was found to be 0.8 weight percent.

(4) Two segments of 0.25 inch diameter plutonium rod weighing a total of 20.0 g. were added at room temperature to a quartz furnace tube containing an amount of 70 w/o $ZnCl_2$—30 w/o NaCl which was 25% in excess of the stoichiometric amount. About 0.5 atmosphere argon was admitted and the tube was heated in a period of one hour to attain a maximum temperature of about 800° C. The system was slowly cooled and a sample of salt was removed through a Pyrex filter at 500° C. Analysis showed the salt to be 70.8 w/o $PuCl_3$, about 0.7 w/o $ZnCl_2$ and (by difference) 28.5 w/o NaCl. About 0.027 g. or 0.14% of the 20.0 g. of plutonium remained in the zinc metal produced. The excess $ZnCl_2$ formed a deposit on the cooler walls of the reaction tube.

(5) 20.93 grams of "fissium" alloy, containing 19.33 grams of plutonium and the amounts of various additional metals indicated in the table below, were added to a salt mixture of 25.485 grams of 70 w/a $ZnCl_2$ and 30 w/o NaCl. The reaction tube was flushed with argon and a protective atmosphere of ½ an atmosphere of argon was maintained. The temperature of the mixture was increased gradually to the melting point and then to 850° C., the latter being held for 15 minutes. The major portion of the salt, weighing 13.191 grams, was removed through a Pyrex filter. This material was chemically analyzed both qualitatively and quantitatively. The results are expressed in the table under the heading "After dissolution."

| Element | Grams Element Per 100 Grams Pu | | Purification Factor |
|---|---|---|---|
| | Fissium Alloy | After Dissolution | |
| Fe | 2.57 | 0.0038 | 680 |
| Zr | 0.728 | <0.002 | >360 |
| Mo | 0.813 | <0.002 | >407 |
| Ru | 1.05 | <0.01 | >150 |
| La | 1.72 | 1.51 | nil |
| Ce | 0.797 | 0.798 | nil |
| Zn | 0 | <0.1 | |

The process of the present invention affords many advantages over prior art processes. The elimination of an aqueous vehicle tremendously reduces the size of the necessary equipment and the space it preempts. The low pressures avoid the use of expensive and bulky pressure vessels. The low temperatures involved avoid the possibility of losses by volatization and make it possible to operate below the melting point of plutonium.

What is claimed is:

1. A method for obtaining the non-aqueous dissolution of a massive material consisting predominantly of plutonium, comprising the steps of forming a melt of said material with a mixture of zinc chloride and sodium chloride in a protective atmosphere of a non-reactive gas at a minimum pressure of about ½ atmosphere, the amount of zinc in said melt being at least the stoichiometric amount required for the complete displacement of said zinc by said plutonium to form plutonium trichloride, and maintaining said melt until the resulting precipitations and distillations are complete.

2. The method of claim 1 in which said mixture consists essentially of 60 to 90 weight percent of $ZnCl_2$, balance Nacl.

3. The method of claim 1 in which said melt consists essentially of about 70 weight percent $ZnCl_2$, balance Nacl.

4. A method of separating plutonium from certain contaminating elements comprising the steps of forming a melt of said contaminated plutonium with a mixture consisting essentially of 10–40 weight percent sodium chloride, balance zinc chloride, in a protective atmosphere of a non-reactive gas at a minimum pressure of about ½ atmosphere, said zinc chloride in said melt being present in at least the stoichiometric amount required for the complete displacement of said zinc by said plutonium, and separating the resulting liquid from the resulting precipitates and distillates.

5. The method of claim 4 in which the fraction of sodium chloride in said mixture is about 30 weight percent and the temperature of said melt is at least 455° C.

6. The method of claim 4 in which the fraction of said sodium chloride in said mixture is about 30 weight percent and the temperature of said melt is gradually increased from about 455° C. to a maximum of about 850° C.

References Cited in the file of this patent

Bareis et al.: "Nucleonics," vol. 12, No. 7, pp. 16–19, July 1954.